United States Patent
Tzadok

(10) Patent No.: US 8,384,917 B2
(45) Date of Patent: Feb. 26, 2013

(54) FONT REPRODUCTION IN ELECTRONIC DOCUMENTS

(75) Inventor: Asaf Tzadok, Nesher (IL)

(73) Assignee: International Business Machines Corporation, Armonk, NY (US)

( * ) Notice: Subject to any disclaimer, the term of this patent is extended or adjusted under 35 U.S.C. 154(b) by 555 days.

(21) Appl. No.: 12/705,651

(22) Filed: Feb. 15, 2010

(65) Prior Publication Data

US 2011/0199627 A1  Aug. 18, 2011

(51) Int. Cl.
*G06K 15/02* (2006.01)
*G06K 15/00* (2006.01)
*G06K 9/34* (2006.01)

(52) U.S. Cl. ....... 358/1.11; 358/2.1; 358/1.18; 358/462; 358/1.9; 382/177; 382/176; 382/178; 382/284; 382/294; 715/244

(58) Field of Classification Search ............... 358/1.9, 358/2.1, 1.11, 1.18, 462; 382/173, 176–179, 382/181, 190, 199, 200, 205, 284, 294; 715/244
See application file for complete search history.

(56) References Cited

U.S. PATENT DOCUMENTS

| | | | |
|---|---|---|---|
| 4,771,474 A * | 9/1988 | Takashima et al. | 382/241 |
| 4,777,651 A | 10/1988 | McCann et al. | |
| 4,926,490 A * | 5/1990 | Mano | 382/177 |
| 4,998,285 A * | 3/1991 | Suzuki et al. | 382/171 |
| 5,111,514 A * | 5/1992 | Ohta | 382/177 |
| 5,594,815 A * | 1/1997 | Fast et al. | 382/254 |
| 5,784,487 A * | 7/1998 | Cooperman | 382/175 |
| 6,753,862 B1 | 6/2004 | Miyasaka et al. | |
| 7,064,757 B1 | 6/2006 | Opstad et al. | |
| 7,142,716 B2 * | 11/2006 | Katsuyama et al. | 382/190 |
| 7,450,268 B2 * | 11/2008 | Martinez et al. | 358/1.9 |
| 7,519,221 B1 | 4/2009 | Nicholson | |
| 7,873,216 B2 * | 1/2011 | Zandifar et al. | 382/177 |
| 2005/0180645 A1* | 8/2005 | Hasegawa et al. | 382/239 |
| 2008/0199081 A1* | 8/2008 | Kimura et al. | 382/190 |

\* cited by examiner

*Primary Examiner* — Twyler Haskins
*Assistant Examiner* — Dennis Dicker

(57) ABSTRACT

A method, system, and computer program product for font reproduction in electronic documents are provided. The method includes: receiving an image of a printed document; extracting pairs of consecutive characters from the image of the printed document; storing the extracted pairs as images of the characters; and reproducing the printed document as an electronic document with text of overlapping extracted character pair images. Extracting pairs of consecutive characters includes extracting adjacent horizontal characters, extracting spaced horizontal characters, and extracting spaced vertical characters. Reproducing the printed document as an electronic document includes reproducing the spacing between words and between lines using the spaced horizontal characters and the spaced vertical characters as anchors in the reproduced document.

25 Claims, 5 Drawing Sheets

FIG. 1
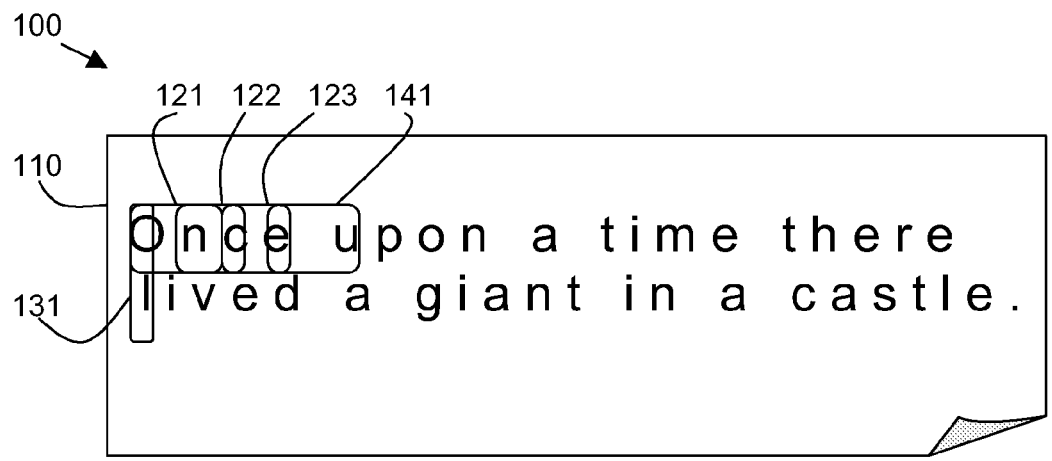
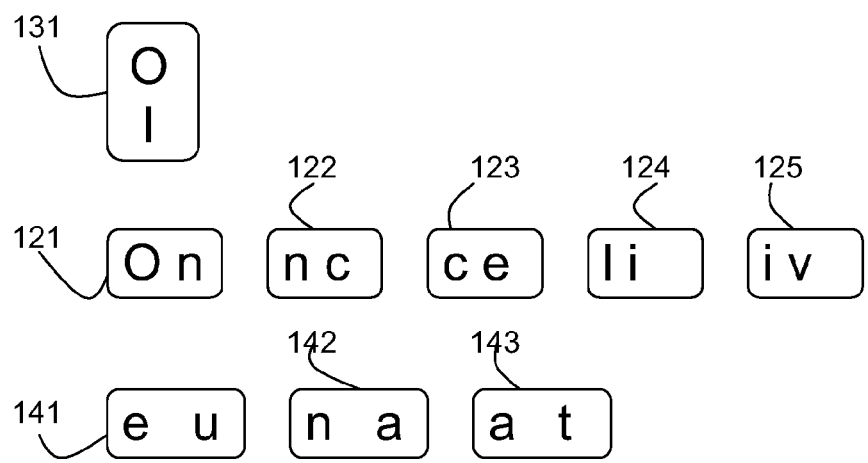
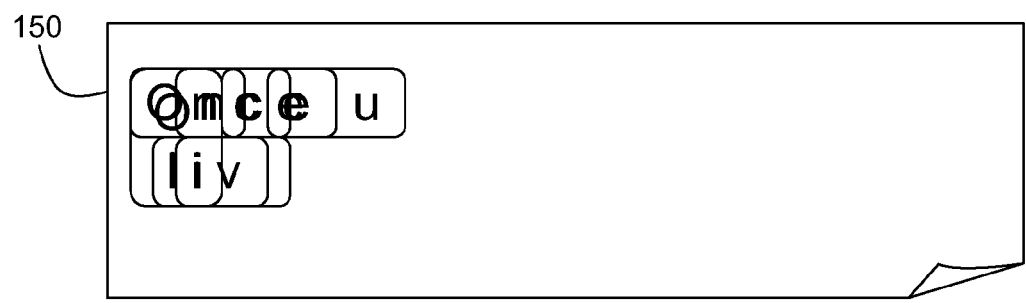

FONT REPRODUCTION IN ELECTRONIC DOCUMENTS

BACKGROUND

This invention relates to the field of font reproduction. In particular, the invention relates to font reproduction in electronic documents generated from scanned images.

There is a significant move towards digitization of printed matter such as books and newspapers to produce electronic versions of the printed matter. Printed matter contains a wide collection of historical fonts. Each font has significant number of variations. One of the challenges is to create a synthetic text reproduction which has the look and feel of the original font. This text reproduction is important in various use cases, including: e-book creation, word-based recognition, word-spotting, fixing typographical errors in the original, etc.

The conventional solutions of this problem try to create true-type font and usually include a font editor. For good reproduction it may also be necessary to find an accurate location of each character in a line and the typical distance to the next character. These kinds of solutions are very hard to implement and require human intervention.

BRIEF SUMMARY

According to a first aspect of the present invention there is provided a method for font reproduction in electronic documents, comprising: receiving an image of a printed document; extracting pairs of consecutive characters from the image of the printed document; storing the extracted pairs as images of the characters; and reproducing the printed document as an electronic document with text of overlapping extracted character pair images; wherein said steps are implemented in either: computer hardware configured to perform said identifying, tracing, and providing steps, or computer software embodied in a non-transitory, tangible, computer-readable storage medium.

According to a second aspect of the present invention there is provided a method for font reproduction in electronic documents, comprising: retrieving stored extracted pair images of consecutive characters from an image of a printed document; and reproducing the printed document as an electronic document with text of overlapping extracted character pair images; wherein said steps are implemented in either: computer hardware configured to perform said identifying, tracing, and providing steps, or computer software embodied in a non-transitory, tangible, computer-readable storage medium.

According to a third aspect of the present invention there is provided a computer program product for font reproduction in electronic documents, the computer program product comprising: a computer readable storage medium having computer readable program code embodied therewith, the computer readable program code comprising: computer readable program code configured to: receive an image of a printed document; extract pairs of consecutive characters from the image of the printed document; store the extracted pairs as images of the characters; and reproduce the printed document as an electronic document with text of overlapping extracted character pair images.

According to a fourth aspect of the present invention there is provided a system for font reproduction in electronic documents, comprising: a processor; an extraction mechanism for extracting pairs of consecutive characters from an image of a printed document; a pairs repository for storing the extracted pairs as images of the characters; and an electronic document creator for reproducing the printed document as an electronic document with text of overlapping extracted character pair images.

BRIEF DESCRIPTION OF THE SEVERAL VIEWS OF THE DRAWINGS

The subject matter regarded as the invention is particularly pointed out and distinctly claimed in the concluding portion of the specification. The invention, both as to organization and method of operation, together with objects, features, and advantages thereof, may best be understood by reference to the following detailed description when read with the accompanying drawings in which:

FIG. 1 is a schematic diagram illustrating font extraction in accordance with an aspect of the present invention;

Figure 2:
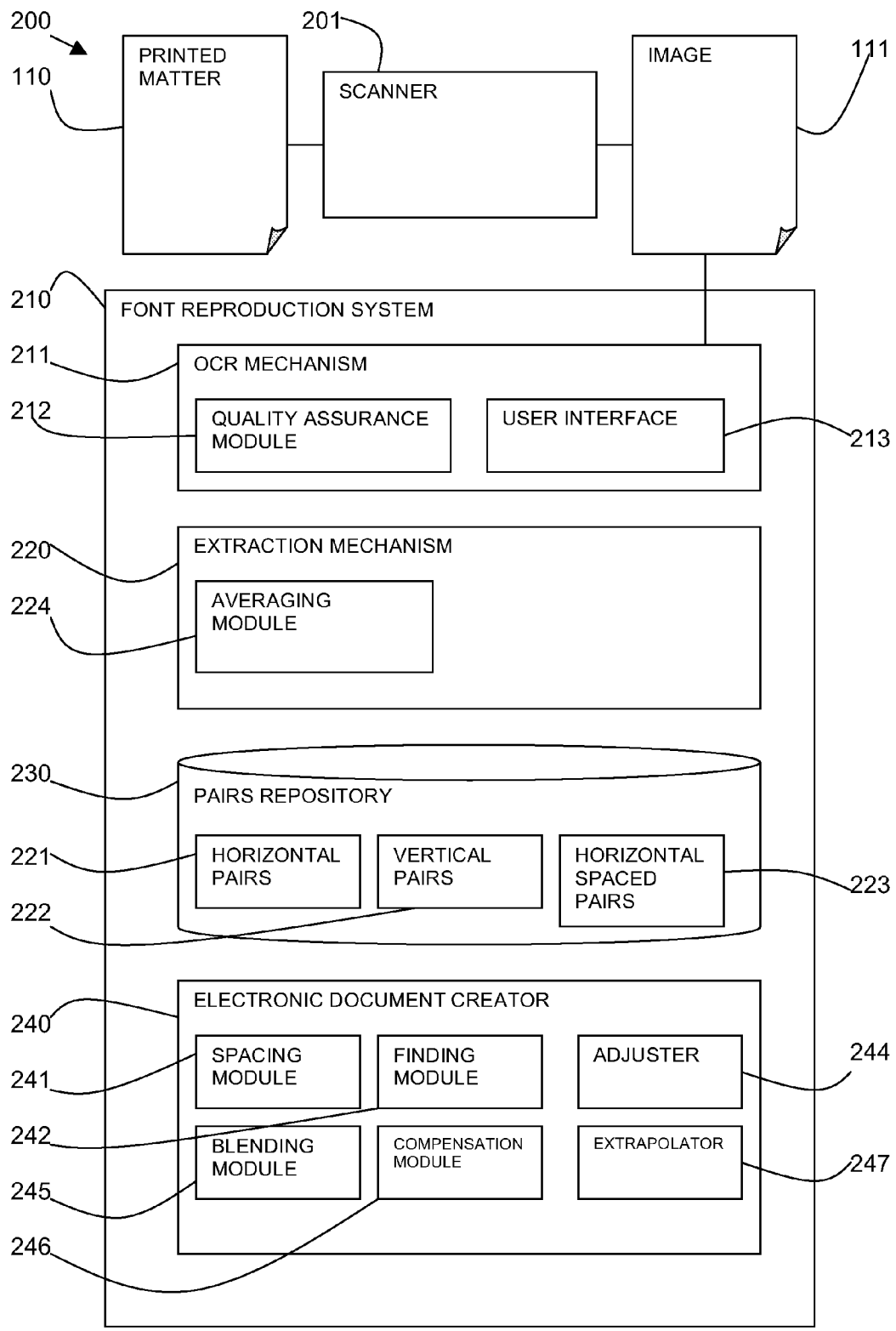
FIG. 2 is a block diagram of a system in accordance with the present invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numbers may be repeated among the figures to indicate corresponding or analogous features.

DETAILED DESCRIPTION

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Method, system and computer program product are described in which font reproduction is carried out for printed matter. Pairs of consecutive characters in a line are extracted and also pairs of characters from consecutive lines. The term "characters" includes letters in a given alphabet, numerical characters, as well as punctuation marks used in the language of the alphabet.

The pairs are used as anchors for the reproduction of the printed matter with accurate spacing. A puzzle of text lines is created and built up using the pairs. Once all possible pairs of characters used in the printed matter are obtained any text can be generated. A relatively small number of pairs are used to generate the font.

Additionally, in cases where a character is missing, pairs of consecutive characters can be extracted with one skipped character.

In one embodiment more than two characters may be extracted and used, for example, triplets of characters may be used. However, the number of triplets needed is greater than the number of pairs resulting in a more complex process. In some instances the increased accuracy of triplet combinations may be desired.

There is no need for user intervention in the described method, enabling automatic reproduction of printed matter as electronic documents. However, user input may be used if the original document is of poor quality. Additionally, the look-and-feel of the original is preserved very accurately.

The first phase of the method is the creation of a font pairs repository of character pair images. In this phase all consecutive pairs of characters in a line are extracted. The pairs of characters may be adjacent characters (including any punctuation marks as characters), or pairs of characters with a word spacing in-between. These pairs within a line help to create a puzzle of a text line with accurate positioning. Pairs of characters which are in the same alignment in two consecutive lines are also extracted. These pairs help with the alignment of consecutive lines and act as anchors. All the pairs are averaged where there are multiple instances of the same pair in order to get high quality and smooth images.

The second phase of an embodiment of the invention is to create text lines from the font pairs repository. In this phase, text lines are created from the pairs' sequences.

The fonts pairs repository stores the character pairs as digital images. The digital images are formed as raster images, which is the representation of images as an array of pixels.

Raster images in general may be referred to as bitmaps or pixmaps, whether synthetic or photographic, in files or memory. Bitmap or pixmap commonly refer to the concept of a spatially mapped array of pixels. In typical uncompressed bitmaps, image pixels are generally stored with a color depth of 1, 4, 8, 16, 24, 32, 48, or 64 bits per pixel. Pixels of 8 bits and fewer can represent either grayscale or indexed color.

Referring to FIG. 1, a schematic diagram 100 illustrates the described method and system of font reproduction. An example printed document 110 is shown including the words:

"Once upon a time there lived a giant in a castle."

Horizontal pairs of font characters 121-125 are extracted from the printed document 110 using an optical character recognition (OCR) and extraction process described further below. The horizontal pairs of font characters 121-125 are extracted for each adjacent pair of characters. In the example given, the example horizontal pairs shown are "On" 121, "nc" 122, "ce" 123, "li" 124, "iv" 125.

Vertical pairs of font characters 131 are also extracted from the printed document 110 for the first vertical pair of font characters in a line. In the example, the vertical pair shown is "OI" 131. The vertical pairs 131 provide information on the spacing between lines.

Horizontal spaced pairs of font characters 141-143 are also extracted from the printed document 110. In the example, the spaced pairs shown are "e_u" 141, "n_a" 142, "a_t" 143. The horizontal spaced pairs 141-143 provide information on the spacing between words.

As shown in FIG. 1, the horizontal pairs 121-125, vertical pairs 131, and horizontal space pairs 141-143 can be used to form a reproduction image 150 of the printed document 110. In FIG. 1 the overlap of characters is shown and in practice the character overlap will be adjusted and merged to provide a reproduction with accurate spacing between the characters vertically and horizontally.

Referring to FIG. 2, a block diagram shows an embodiment of the described system 200. A printed document 110 is provided which is scanned by a scanner 201 to produce an image 111 of the printed document 110 which image 111 is input into a described font reproduction system 210.

The font reproduction system 210 includes an OCR mechanism 211 for character recognition of the characters of the printed document 110. The term optical character recognition is known to include digital imaging processes as well as optical processes for character recognition. The OCR mechanism 211 recognises each character individually with its location. The OCR mechanism 211 includes a quality assurance module 212 which provides a measure of confidence in the recognition of a character by the OCR mechanism 211. The quality assurance module 212 may include a choice of alternative characters with confidence scores of the alternatives.

An optional user interface 213 is provided for the OCR mechanism 211 to enable key-in input by a user to correct or verify the OCR mechanism's 211 output. This is particularly needed if the quality of the original document is poor. The user interface 213 is optional as, in one embodiment, the automatic character recognition of the OCR mechanism 211 may be relied upon without user input.

The font reproduction system 210 includes an extraction mechanism 220 for extracting character pairs from the OCR mechanism 211. The pairs are extracted as images of the characters with relative positions of the characters. For example, the images may be bitmap images. The extracted character pairs are horizontal character pairs 221, vertical character pairs 222, and horizontal spaced character pairs 223. The extraction mechanism 220 includes an averaging module 224 for averaging the bitmap images.

The averaging module 224 may take multiple instances of the same character pair and average the bitmap images. Alternatively, the averaging module 224 may average the bitmap images and select the best instance closest to the average which may be better than the average itself. For example, if one instance is very well defined and all other instances are not well defined, the less well defined instances will impact on the quality of the average compared to the well defined instance.

The font reproduction system 210 includes a pairs repository 230 for storing the extracted and averaged character pairs 221, 222, 223 in the form of images. The aim is to extract sufficient character pairs 221, 222, 223 for a given font to reproduce a document. An optimum is to collect consecutive horizontal pairs of all character combinations and sufficient vertical and spaced horizontal pairs to obtain an accurate spacing layout of the font.

The font reproduction system 210 includes an electronic document creator 240 for creating a reproduction of a printed document 110. The electronic document creator 240 includes a spacing module 241 for text line, word spacing, and line spacing of the character pair images. The electronic document creator 240 also includes a finding module 242 for finding adjacent character pair images, an adjuster 244 for adjusting the character pairs' positions to arrive at relative positions with a high correlation of the overlapping character, and a blending module 245 for blending and smoothing the overlapping character pairs.

The electronic document creator 240 also includes a compensation module 246 for generating missing characters by using a wildcard spacing in a stored image pair.

The electronic document creator 240 also includes an extrapolator 247 for extrapolating character pairs to create missing character pairs.

Figure 3:
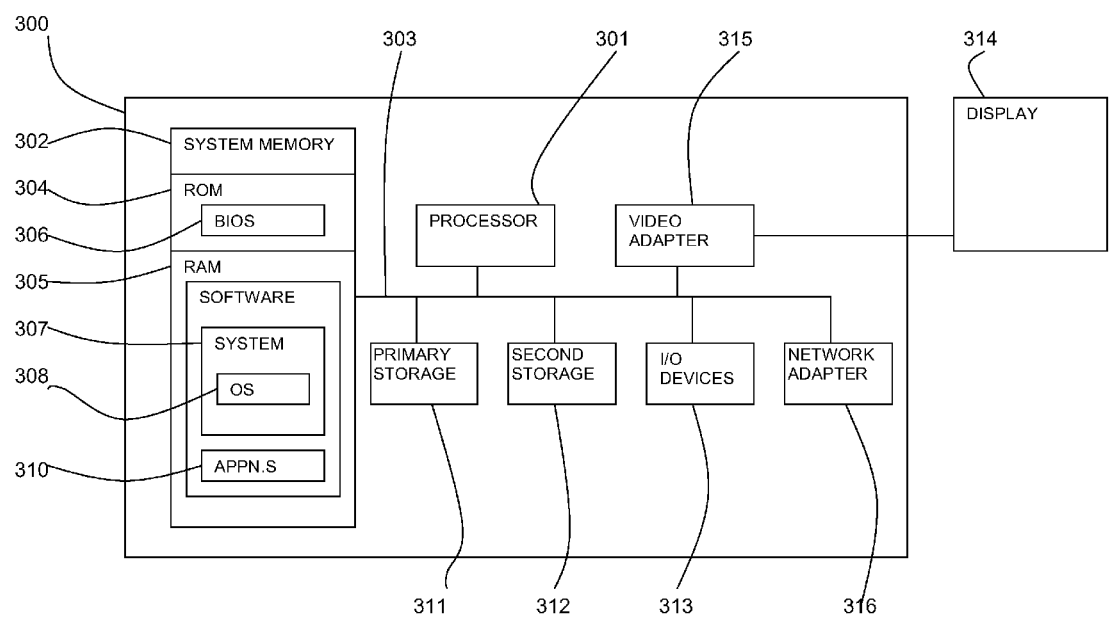
FIG. 3 is a block diagram of a computer system in which the present invention may be implemented.

Referring to FIG. 3, an exemplary system for implementing aspects of the invention includes a data processing system 300 suitable for storing and/or executing program code including at least one processor 301 coupled directly or indirectly to memory elements through a bus system 303. The memory elements can include local memory employed during actual execution of the program code, bulk storage, and cache memories which provide temporary storage of at least some program code in order to reduce the number of times code must be retrieved from bulk storage during execution.

The memory elements may include system memory 302 in the form of read only memory (ROM) 304 and random access memory (RAM) 305. A basic input/output system (BIOS) 306 may be stored in ROM 304. System software 307 may be stored in RAM 305 including operating system software 308. Software applications 310 may also be stored in RAM 305.

The system 300 may also include a primary storage means 311 such as a magnetic hard disk drive and secondary storage means 312 such as a magnetic disc drive and an optical disc drive. The drives and their associated computer-readable media provide non-volatile storage of computer-executable instructions, data structures, program modules and other data for the system 300. Software applications may be stored on the primary and secondary storage means 311, 312 as well as the system memory 302.

The computing system 300 may operate in a networked environment using logical connections to one or more remote computers via a network adapter 316.

Input/output devices 313 can be coupled to the system either directly or through intervening I/O controllers. A user may enter commands and information into the system 300 through input devices such as a keyboard, pointing device, or other input devices (for example, microphone, joy stick, game pad, satellite dish, scanner, or the like). Output devices may include speakers, printers, etc. A display device 314 is also connected to system bus 303 via an interface, such as video adapter 315.

Figure 4:
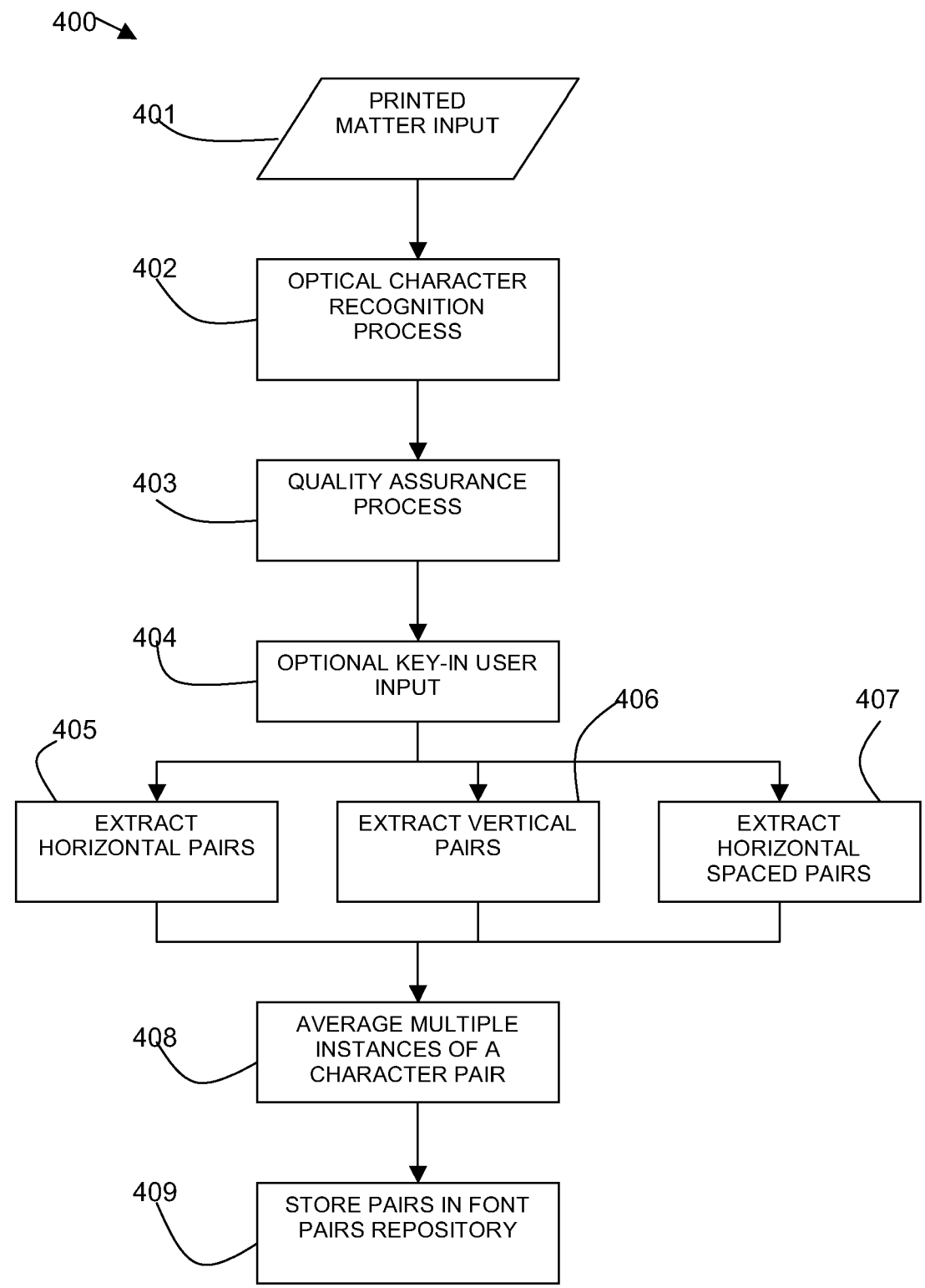
FIG. 4 is a flow diagram of a method of font extraction in accordance with an aspect of the present invention.

Referring to FIG. 4, a flow diagram 400 shows a process of font extraction. A document of printed matter is input 401 and an OCR process 402 recognises characters within the printed matter. A quality assurance process 403 indicates if the OCR process has a high confidence in the character recognition. An option key-in process by a user is used 404 to confirm any ambiguous characters.

From the OCR process, the area of pairs of consecutive characters is cropped and the character pairs are extracted in the form of images of horizontal pairs 405, pairs of characters from consecutive lines are extracted in the form of vertical pairs 406, and pairs of characters with word spacings are extracted in the form of horizontal spaced pairs 407.

Multiple instances of the same character pair images are averaged 408 to obtain the best image. The image pairs are stored 409 as in a font pairs repository for use during the font reproduction process.

In one embodiment, an input document may be a book of multiple pages. The process automatically selects the pairs which have a high confidence until a selection of all or as many as possible character pair combinations are obtained. The vertical character pairs are automatically selected where characters are vertically aligned and to provide the distance between lines, for example, at the beginning of a new line.

Figure 5:
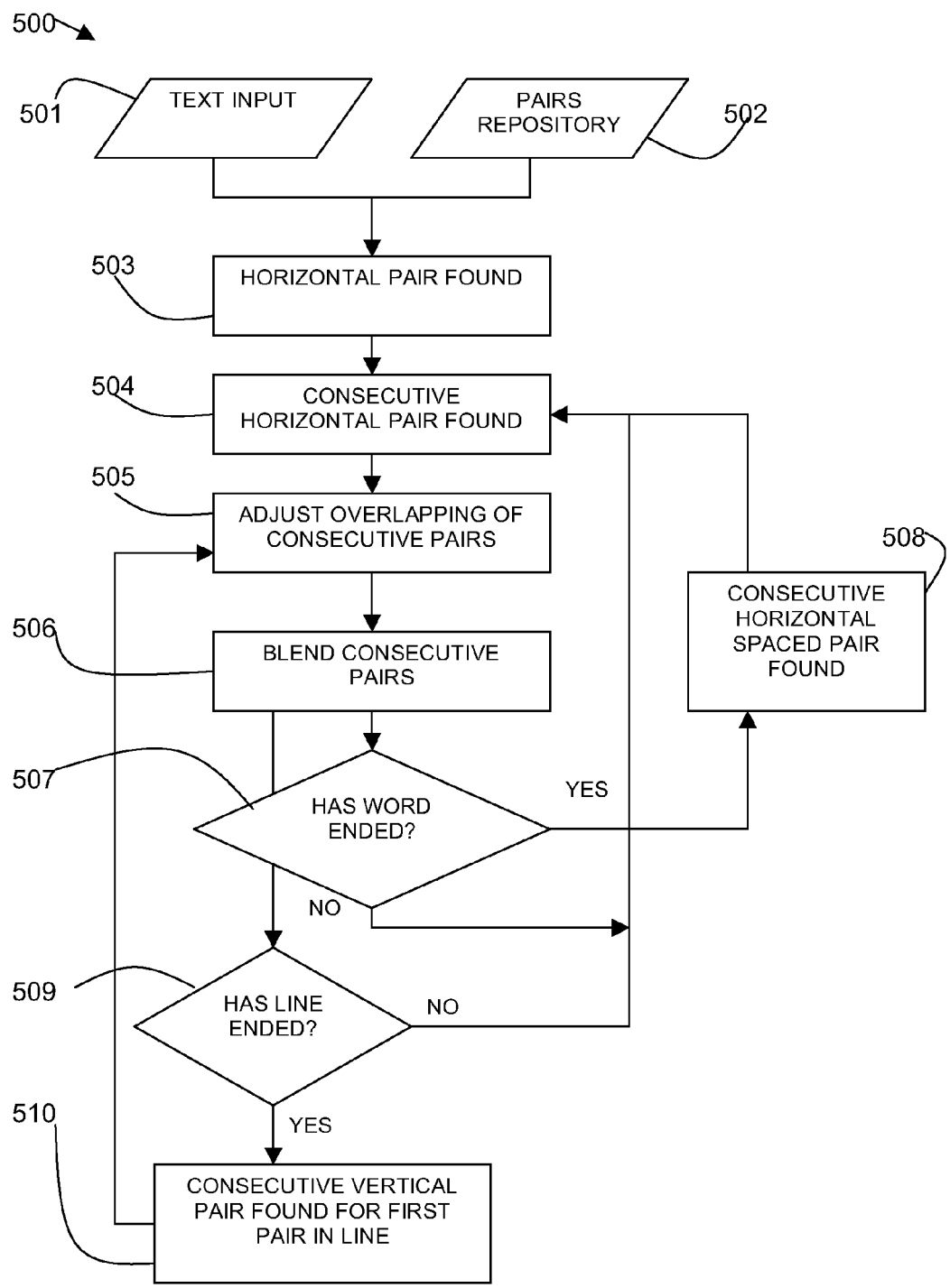
FIG. 5 is a flow diagram of a method of font reproduction in accordance with an aspect of the present invention.

Referring to FIG. 5, a flow diagram 500 shows an example embodiment of a process of font reproduction. Text for the printed matter reproduction is input 501 and the pairs repository 502 is accessed.

A first horizontal pair of characters for the input text is found 503 and then a consecutive horizontal character pair is found 504 overlapping with the first pair. The consecutive pairs are adjusted 505 to correlate over the overlapping character and the consecutive pairs are blended 506 to smooth the overlap.

It is determined 507 if a word has ended. If the word has not ended, the next consecutive horizontal pair is found 504. If the word has ended, a horizontal spacing pair is used 508 and the method continues to the next consecutive horizontal pair 504.

It is also determined 509 if the line has ended. If the line has ended so a vertical pair is found 510 overlapping with the first pair. The process continues along the next line. If the line has not ended, the next consecutive horizontal pair is found 504.

Spacing pairs are used such as "A_A" are used in order to synchronise the positioning between words and create a smooth line. Spaces between words may vary in pitch between different fonts. In some fonts, for example, Gothic font, the pitch of spaces is very narrow. In order to obtain the correct spacing between words, character pairs with spaces are extracted and stored for use in the font reproduction.

For spacing and alignment between lines, the pairs of vertically aligned characters are used. For example, in the text below, the spacing and alignment are generated using the "AG" pairs which are the first characters in consecutive lines:

ABCD GHJDS JDLKS
GHDKS DSDA DSDAS

The described method and system also accommodate missing characters, or characters for which the OCR has a low confidence in the font reproduction. For example, the word "ABCD" can be created from the following pairs : "AB", "BC", "CD". In a case where the "AB" is missing, the following pairs can be used: "A C" (note the space between the A and C), "BC", "CD". The result is the same with no overlap on the "B".

The space of the missing character can be represented by a wildcard in the pairs repository to indicate a missing character. Pairs of characters with a wildcard in between them are stored for use where a character is missing.

In cases in which the full resource of fonts pairs are not available, the font is extrapolated from the available pairs.

The resultant output is a file made up of overlapping character pairs. The file is editable using the character pairs. A bitmap pair font is defined and font resources extended. An operating system may support the bitmap pair font with a viewer or editor able to handle the bitmap pair font. The bitmap pair font may be included in a file itself so that an editor can extract it and edit the document.

Font reproductions of scanned printed matter may be provided as a service to a customer over a network.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A method for font reproduction in electronic documents, comprising:
    receiving an image of a printed document;
    extracting pairs of consecutive characters from the image of the printed document;
    storing the extracted pairs as images of the characters; and
    reproducing the printed document as an electronic document with text of overlapping extracted character pair images;
  wherein said steps are implemented in either:
    computer hardware configured to perform said identifying, tracing, and providing steps, or
    computer software embodied in a non-transitory, tangible, computer-readable storage medium.

2. The method as claimed in claim 1, wherein extracting pairs of consecutive characters includes extracting adjacent horizontal characters, extracting spaced horizontal characters, and extracting spaced vertical characters.

3. The method as claimed in claim 2, wherein reproducing the printed document as an electronic document includes reproducing the spacing between words using the spaced horizontal characters and between lines using the spaced vertical characters.

4. The method as claimed in claim 1, including averaging the images in the form of bitmaps of the extracted pairs.

5. The method as claimed in claim 1, wherein reproducing the printed document as an electronic document includes:
finding adjacent overlapping pairs;
adjusting the overlap by correlation of an overlapping character; and
blending the pairs.

6. The method as claimed in claim 1, including storing all possible character pairs used in the printed document, wherein a character is a letter of an alphabet, a numeric character, or a punctuation character.

7. The method as claimed in claim 1, including storing character pairs with a missing wildcard character for use when a character is missing.

8. The method as claimed in claim 1, wherein reproducing the printed document as an electronic document includes:
compensating for a missing character by using a wildcard spacing and overlapping the wildcard with the consecutive character.

9. The method as claimed in claim 1, including extrapolating character pairs to create missing character pairs.

10. The method as claimed in claim 1, wherein the character pairs are extracted by an optical character recognition process with a confidence measure of a character recognition.

11. The method as claimed in claim 10, wherein user input is made to confirm a character recognition.

12. The method as claimed in claim 1, wherein extracting pairs of consecutive characters includes extracting sequences of more than two consecutive characters.

13. A method for font reproduction in electronic documents, comprising:
retrieving stored extracted pair images of consecutive characters from an image of a printed document; and
reproducing the printed document as an electronic document with text of overlapping extracted character pair images;
wherein said steps are implemented in either:
computer hardware configured to perform said identifying, tracing, and providing steps, or
computer software embodied in a non-transitory, tangible, computer-readable storage medium.

14. A computer program product for font reproduction in electronic documents, the computer program product comprising:
a non-transitory computer readable storage medium having computer readable program code embodied therewith, the computer readable program code comprising:
computer readable program code configured to:
receive an image of a printed document; extract pairs of consecutive characters from the image of the printed document; store the extracted pairs as images of the characters; and
reproduce the printed document as an electronic document with text of overlapping extracted character pair images.

15. A system for font reproduction in electronic documents, comprising:
a processor;
an extraction mechanism for extracting pairs of consecutive characters from an image of a printed document;
a pairs repository for storing the extracted pairs as images of the characters; and
an electronic document creator for reproducing the printed document as an electronic document with text of overlapping extracted character pair images.

16. The system as claimed in claim 15, wherein the extraction mechanism extracts pairs of consecutive characters including extracting adjacent horizontal characters, extracting spaced horizontal characters, and extracting spaced vertical characters.

17. The system as claimed in claim 16, wherein the electronic document creator includes a spacing module for reproducing the spacing between words and between lines using the spaced horizontal characters and the spaced vertical characters.

18. The system as claimed in claim 15, wherein the extraction mechanism includes an averaging module for averaging the extracted images in the form of bitmaps.

19. The system as claimed in claim 15, wherein the electronic document creator includes:
a finding module for finding adjacent overlapping pairs;
an adjustor for adjusting the overlap by correlation of an overlapping character; and
a blending module for blending the image pairs.

20. The system as claimed in claim 15, wherein the electronic document creator includes a compensation module for generating a missing character by using a wildcard spacing in an image pair and overlapping the wildcard with a consecutive character.

21. The system as claimed in claim 15, wherein the pairs repository includes a store of all possible character pairs used in the printed document, wherein a character is a letter of an alphabet, a numeric character, or a punctuation character.

22. The system as claimed in claim 15, wherein the pairs repository includes a store of character pairs with a missing wildcard character for use when a character is missing.

23. The system as claimed in claim 15, wherein the electronic document creator includes an extrapolator for extrapolating character pairs to create missing character pairs.

24. The system as claimed in claim 15, wherein the extraction mechanism includes an optical character recognition system with a confidence measure of a character recognition.

25. The system as claimed in claim 24, wherein the optical character recognition system includes a user interface for user input to confirm a character recognition.

* * * * *